US010625682B2

(12) United States Patent
Sharon et al.

(10) Patent No.: US 10,625,682 B2
(45) Date of Patent: Apr. 21, 2020

(54) AUTOMOBILE HEADREST HANGING HAT RACK

(71) Applicants: Arie Nissan Sharon, Garland, TX (US); Michael Sharon, Kfar-Sabba (IL)

(72) Inventors: Arie Nissan Sharon, Garland, TX (US); Michael Sharon, Kfar-Sabba (IL)

(*) Notice: Subject to any disclaimer, the term of this patent is extended or adjusted under 35 U.S.C. 154(b) by 92 days.

(21) Appl. No.: 15/860,961

(22) Filed: Jan. 3, 2018

(65) Prior Publication Data
US 2019/0009728 A1 Jan. 10, 2019

Related U.S. Application Data

(60) Provisional application No. 62/498,584, filed on Jan. 3, 2017.

(51) Int. Cl.
| | | |
|---|---|---|
| *B60R 7/10* | (2006.01) | |
| *B60N 2/879* | (2018.01) | |
| *B60R 11/00* | (2006.01) | |
| *B60N 2/80* | (2018.01) | |
| *B60N 2/90* | (2018.01) | |

(52) U.S. Cl.
CPC ............... *B60R 7/10* (2013.01); *B60N 2/879* (2018.02); *B60N 2002/899* (2018.02); *B60N 2002/905* (2018.02); *B60R 2011/0017* (2013.01)

(58) Field of Classification Search
CPC .......... B60R 7/10; B60R 7/043; B60N 2/879; B60N 2002/905; Y10S 224/927; Y10S 223/04
See application file for complete search history.

(56) References Cited

U.S. PATENT DOCUMENTS

| | | | | | |
|---|---|---|---|---|---|
| 1,480,829 | A | * | 1/1924 | Moran | A47G 25/0607 211/32 |
| 2,255,973 | A | * | 9/1941 | Hoobler | A47C 7/62 211/119.007 |
| 2,471,007 | A | * | 5/1949 | Pasznicki | A47G 25/20 223/88 |
| 4,480,775 | A | * | 11/1984 | Stanford | A45F 3/14 224/161 |
| 4,757,928 | A | * | 7/1988 | Browne | B60N 3/103 224/275 |

(Continued)

OTHER PUBLICATIONS

Bremar Police Solutions, http://www.policehatrack.com, Bremar Police Solutions Makers of Quality Hat Holders for Your Vehicle, 2009.

*Primary Examiner* — Brian D Nash
(74) *Attorney, Agent, or Firm* — Blynn L. Shideler; Krisanne Shideler; BLK Law Group

(57) ABSTRACT

An automobile head rest hanging hat rack is configured to be coupled to the headrest of an automobile seat, wherein the hat rack is formed as a single piece, knock down structure, a back configured to be adjacent to the automobile seat, a base coupled to a lower end of the back and extending away from the back and a hat hanging member coupled to the base at a position opposite the position of the coupling of the back to the base, wherein the hat hanging member is configured to be spaced from the automobile seat and configured to engage the interior of an American cowboy hat or traditional Police Sherriff's hat to be engaged at a position above the sweatband of the hat.

18 Claims, 4 Drawing Sheets

(56) References Cited

U.S. PATENT DOCUMENTS

| | | | | |
|---|---|---|---|---|
| 4,805,782 | A * | 2/1989 | Hale | A47G 25/10 211/113 |
| 4,957,230 | A * | 9/1990 | Gonzales | A47G 25/14 223/88 |
| D323,284 | S * | 1/1992 | Thompson | D6/320 |
| 5,104,083 | A * | 4/1992 | Shannon | B60R 7/10 211/105.1 |
| D440,053 | S * | 4/2001 | Richter | D6/317 |
| 6,220,489 | B1 * | 4/2001 | Sato | A47C 7/64 223/94 |
| 6,260,750 | B1 * | 7/2001 | Chiang | B60R 7/10 224/275 |
| D447,656 | S * | 9/2001 | Richter | D12/416 |
| 6,651,941 | B1 * | 11/2003 | Kinsel | A45F 5/1026 248/100 |
| D526,131 | S | 8/2006 | McGowan | |
| 7,566,036 | B1 * | 7/2009 | Galway | B60R 11/0247 248/218.4 |
| D599,272 | S * | 9/2009 | Feder | D12/223 |
| 7,784,864 | B2 * | 8/2010 | Feder | B60R 7/043 297/188.06 |
| 9,539,949 | B2 * | 1/2017 | Nuako | B60R 7/043 |
| 10,040,399 | B1 * | 8/2018 | Manzo | B60N 2/809 |
| 2013/0037672 | A1 * | 2/2013 | Sanchez | B60R 7/10 248/303 |
| 2013/0221712 | A1 * | 8/2013 | Sanchez | B60N 2/838 297/188.03 |
| 2014/0021230 | A1 * | 1/2014 | Sanchez | B60R 7/10 224/275 |
| 2015/0183379 | A1 * | 7/2015 | Hensley | B60R 7/10 297/188.03 |
| 2016/0130003 | A1 * | 5/2016 | Arriola | B60N 2/882 297/397 |

* cited by examiner

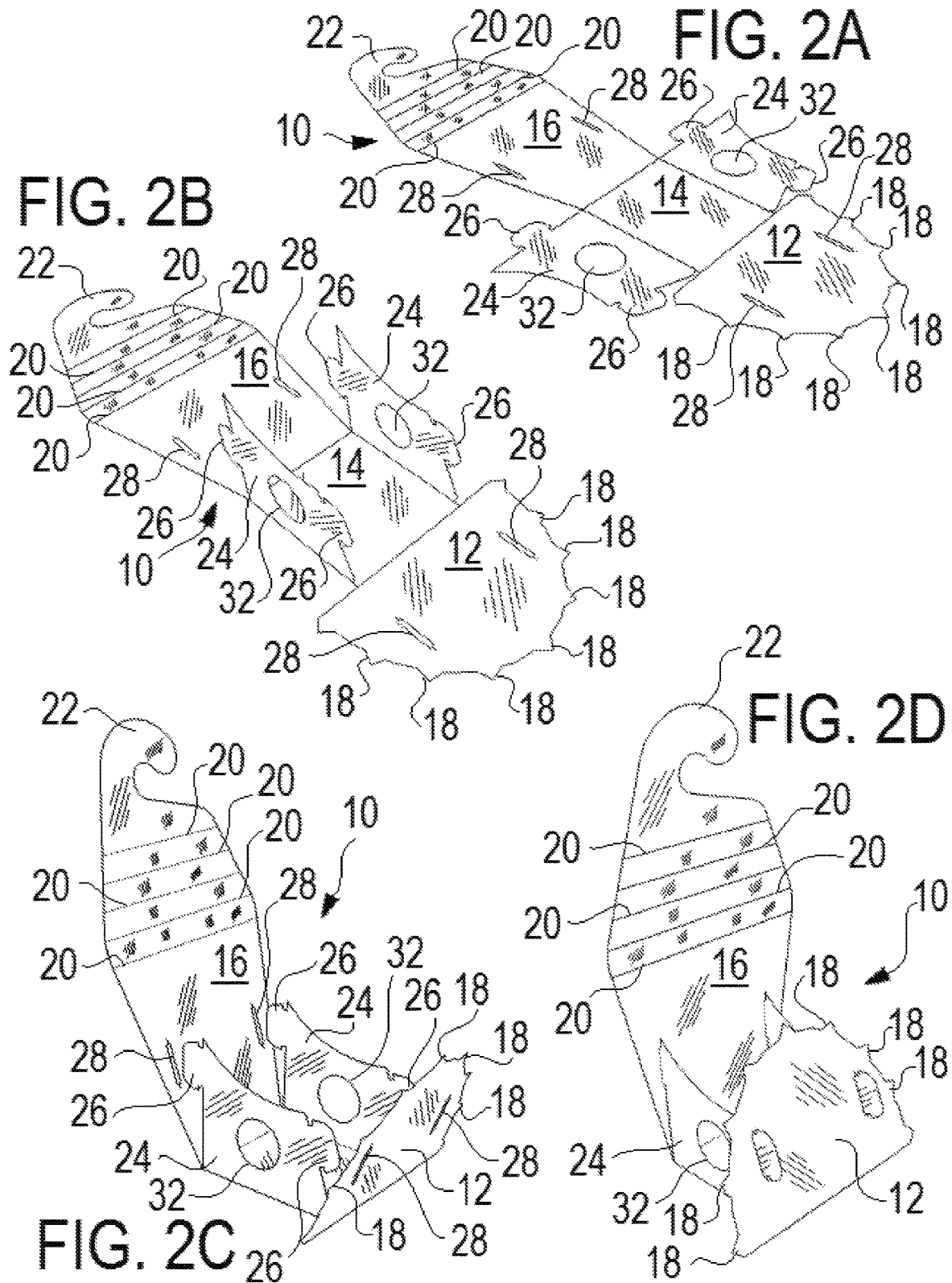

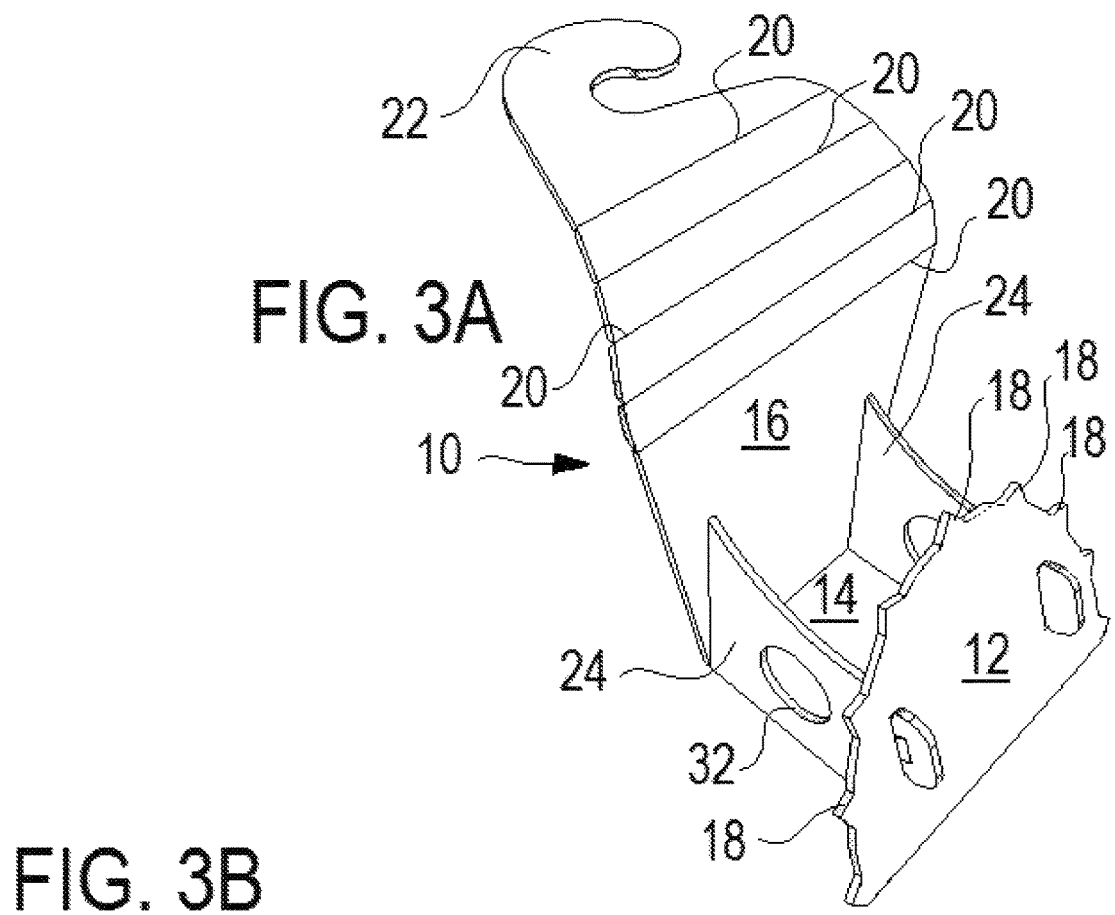
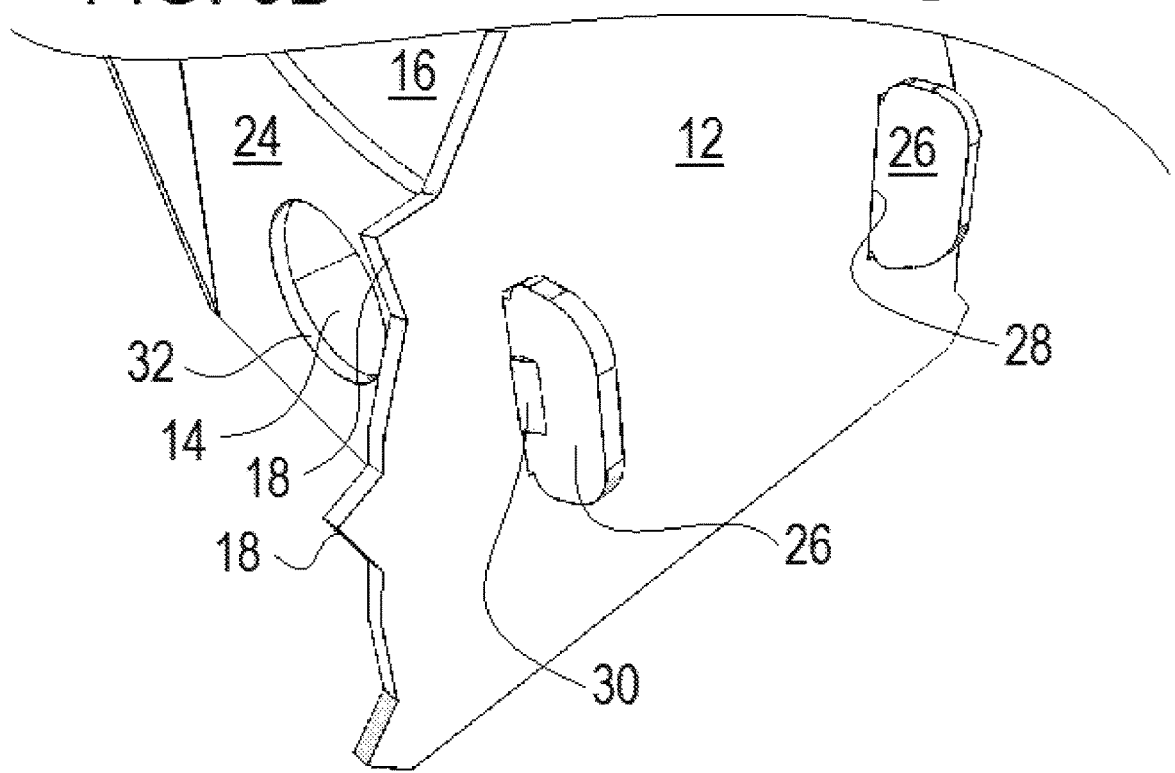

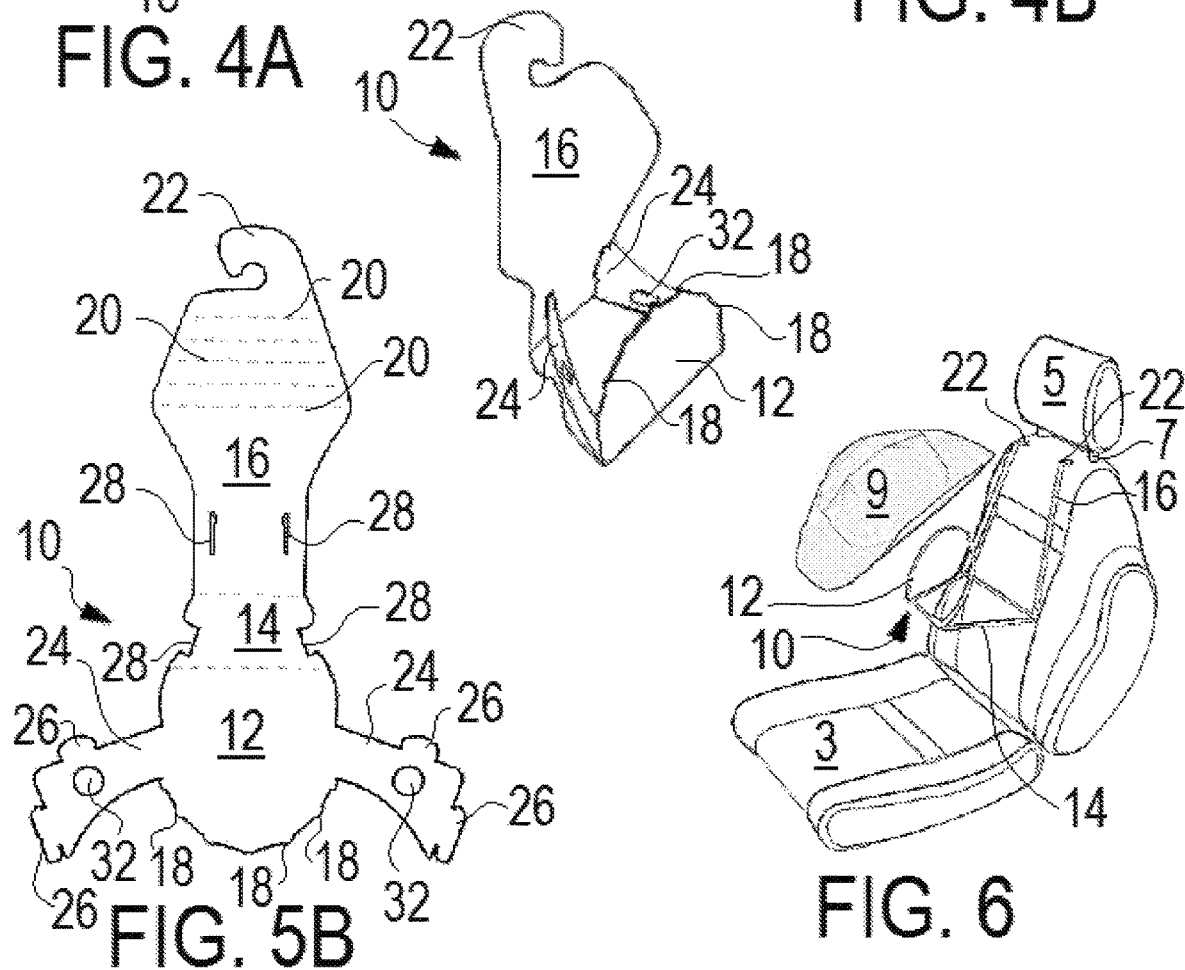

AUTOMOBILE HEADREST HANGING HAT RACK

RELATED APPLICATIONS

This application claims the benefit of Provisional Application Ser. No. 62/498,584 filed Jan. 3, 2017 entitled "Automobile Hat Hanger", which application is incorporated herein by reference.

BACKGROUND OF THE INVENTION

Field of the Invention

The present invention pertains to hat supporting device, and more particularly to an automobile hat hanger.

Background Information

It is well known that for certain style hats, such as an American cowboy hat or traditional Police Sherriff's hat, the user cannot easily wear the hat in the vehicle. Further it is well known that driving with an American cowboy hat or traditional Police Sherriff's hat lying on the seat or on the dash can greatly shorten the life of the hat and the appearance during this shortened life. This is often identified as the chief reason for such hats losing their shape. Hats stowed in this manner can be bounced around the car interior during transport and are often sat upon by passengers, or they can have something inadvertently thrown on top of the hat. Additionally the dash storage will obstruct vision of the driver and is disfavored.

These known concerns have led to a number of vehicle hat racks or hat hangers which have been developed to facilitate safe storage of the hats in vehicles. For example, the RIDE-ALONG™ brand from Bremar Police Solutions consists of a wire frame that engages the outside of the brim of a hat and is mounted on the base of an automobile seat generally taking up a passenger seat. Additionally, there is the clip on hat hanger described in U.S. Pat. No. D526,131 and sold under the brand name the ULTIMATE HAT HANGER™. Further, the HATRIDER™ brand hanger described in www.hatrider.com comprises a conventional coat hanging hook mounted to a post of an automobile headrest. The HATRIDER™ brand hat rack or hanger is a conventional hook having a single point of contact.

The HARD HAT HOOK™ brand sold by ABC Safety Mart is a wire frame u-shaped support that is placed over an automobile headrest. This prior art is branded as the HARD HAT HOOK™ because the adjustable head band portion of conventional hard hats is intended to loop over the wire frame and "hook" onto the frame, and does not refer to a hook for a hat that has a single point of contact.

The above representative solutions of the prior art show there is a need in the art for effective efficient vehicle hat hangers and it is an object of the present invention is to provide an cost effective, efficient, and universal vehicle hat hanger.

SUMMARY OF THE INVENTION

The object of the present invention is achieved according to one embodiment of the present invention by providing an automobile head rest hanging hat rack configured to be coupled to the headrest of an automobile seat including an oval shaped hat hanging member configured to be spaced from the automobile seat and configured to engage the interior of an American cowboy hat or traditional Police Sherriff's hat to be engaged at a position above the sweatband of the hat.

One embodiment of the invention provides an automobile head rest hanging hat rack is configured to be coupled to the headrest of an automobile seat, wherein the hat rack is formed as a single piece, knock down structure, a back configured to be adjacent to the automobile seat, a base coupled to a lower end of the back and extending away from the back and a hat hanging member coupled to the base at a position opposite the position of the coupling of the back to the base, wherein the hat hanging member is configured to be spaced from the automobile seat and configured to engage the interior of an American cowboy hat or traditional Police Sherriff's hat to be engaged at a position above the sweatband of the hat The features that characterize the present invention are pointed out with particularity in the claims which are part of this disclosure. These and other features of the invention, its operating advantages and the specific objects obtained by its use will be more fully understood from the following detailed description.

BRIEF DESCRIPTION OF THE FIGURES

FIGS. 2A-D illustrate the formation of the automobile head rest hanging hat rack of FIG. 1 from a single piece, knock down structure to the assembled automobile head rest hanging hat rack of FIG. 1;

FIG. 3A is a perspective view of the automobile head rest hanging hat rack of FIG. 1 with the back bent to follow the contour of the automobile seat;

FIG. 3B is an enlarged perspective view of a portion of the automobile head rest hanging hat rack of FIG. 3A showing the coupling of side ribs to the oval hat hanging member;

FIG. 4A-B are perspective views of the automobile head rest hanging hat rack of FIG. 1 showing the bending of the horizontal hinges to allow the back to follow the contour of the automobile seat;

FIGS. 5A and B are assembled and knocked down perspective views of an automobile head rest hanging hat rack according to another embodiment of the present invention; and FIG. 6 is a perspective view of an automobile head rest hanging hat rack according to another embodiment of the present invention which is hanging from the headrest of an automobile seat with a cowboy style hat adjacent.

DESCRIPTION OF THE PREFERRED EMBODIMENTS

Figure 1A:
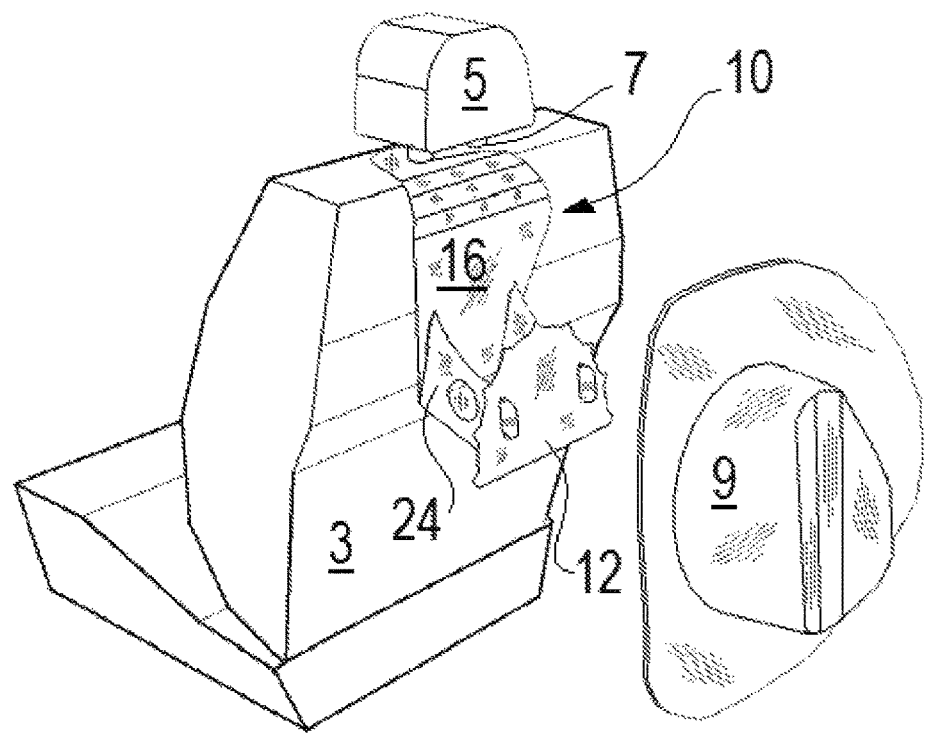
FIG. 1A is a perspective view of an automobile head rest hanging hat rack according to one embodiment of the present invention which is hanging from the headrest of an automobile seat with a cowboy style hat adjacent.

As used herein, the singular form of "a", "an", and "the" include plural references unless the context clearly dictates otherwise. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The present invention relates to an automobile hat hanger 10 configured to be coupled to the headrest post 7 of a headrest 5 of an automobile seat 3, and thus it may be referenced as an automobile head rest hanging hat rack 10. The term hat hanger 10 defines a device for supporting a hat 9 and may be used interchangeably with hat rack 10 or hat rest 10. A hat hook is also a conventional type of hat hanger, but the hat hanger 10 of the present invention avoids a single point connection with the hat 9 that may be detrimental to the hat 9 and which is used in a conventional "hook" thus the hat rack 10 present invention is not considered a hook.

Figure 1B:
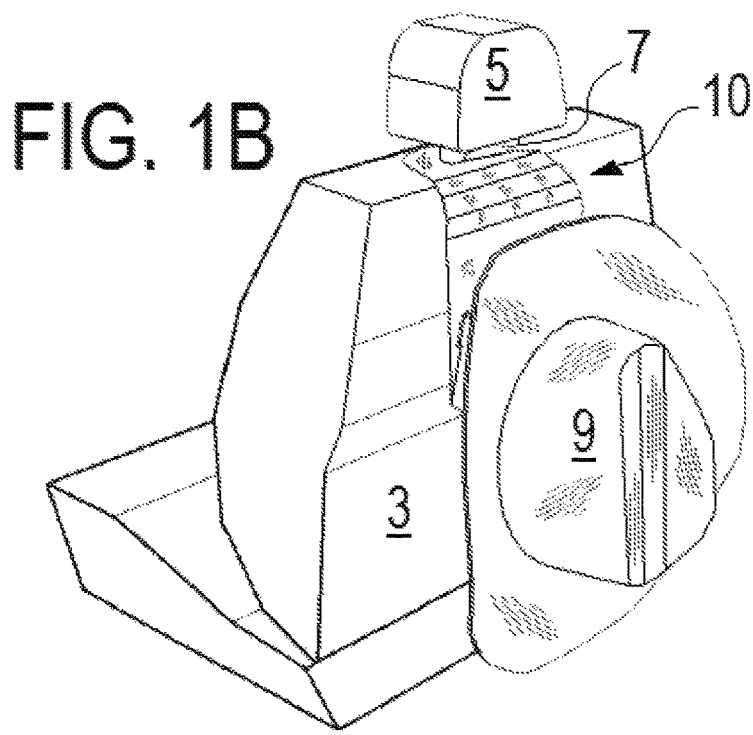
FIG. 1B is a perspective view of the automobile head rest hanging hat rack of FIG. 1 with a cowboy style hat hanging thereon.

As described below the invention provides an automobile head rest hanging hat rack 10 configured to be coupled to the headrest 5 of an automobile seat 3, the hat rack 10 comprising an oval shaped hat hanging member 12 configured to be spaced from the automobile seat 3 and configured to engage the interior of an American cowboy hat 9 or traditional Police Sherriff's hat 9 to be engaged at a position above the sweatband of the hat 9. "Above the sweatband" is relative to the hat 9 and defines the hat hanging member 12 is configured to be engaging the hat 9 further into the interior of the hat 9 toward the top of the hat than the position of the sweatband. FIG. 1A is a perspective view of the automobile head rest hanging hat rack 10 according to one embodiment of the present invention which is hanging from the headrest 5 of an automobile seat 3 with a cowboy style hat 9 adjacent and FIG. 1B is a perspective view of the automobile head rest hanging hat rack 10 of FIG. 1 with the cowboy style hat 9 hanging thereon.

One embodiment of the present invention provides a single piece, die cut, knock down structure for the hat rack 10 that is assembled into the automobile hat rack 10 according to the present invention. FIGS. 2A-D illustrate the formation of the automobile head rest hanging hat rack 10 of FIG. 1 from a single piece, knock down structure to the assembled automobile head rest hanging hat rack 10 of FIG. 1

The automobile head rest hanging hat rack 10 according to the invention forms the hat hanging member 12 as an ellipse or oval shaped for that portion of the hat hanging member 12 that engages the hat 9. The specific shape is frusto-elliptical or frusto-oval as the ellipse or oval is "cut off" where the member 12 meets and is coupled to the base 14. However as the perimeter of the member 12 above the base 14 is oval or elliptical the member 12 is considered an oval or ellipse in this application. This oval or ellipse shape for member 12 prevents the hat 9 from swinging, at least minimizing this motion, and better supports the hat 9 preventing deformation of the hat 9 and not decreasing the life of the hat 9.

The automobile head rest hanging hat rack 10 according to the invention comprises a back 16 configured to be adjacent to the automobile seat 3, with the base 14 coupled to a lower end of the back 16, such as through a living hinge, and extending away from the back 14 and the oval shaped hat hanging member 12 coupled to the base 14, also through a living hinge, at a position opposite the position of the coupling of the back 16 to the base 14. The automobile head rest hanging hat rack 10 has the oval shaped hat hanging member 12 extends from the base 14 in a direction extending toward the back 16 wherein it is configured to extend no greater than vertical when the hat rack 10 is coupled to the headrest 5 via post 7 of an automobile seat 3. No greater than vertical means the member 12 will be vertical or extending toward the seat 3 from the base 14, which will assist in holding the hat 9 on the rack 10 in operation.

The automobile head rest hanging hat rack 10 according to the invention may have the back 16 which gets wider for a portion thereof as shown to allow for or assist in hanging stability as it leans against the seat 3. The back 16 and the member 12 provide advertising space, as the rack 10 may be a promotional item with the person sponsoring the promotion using the space on the back 16 and or the member 12.

The automobile head rest hanging hat rack 10 according to invention may include a perimeter of the oval shaped hat hanging member 12 having a plurality of projections 18 extending therefrom configured to have the plurality of the projections 18 engage above the sweatband of the hat 9. The perimeter projections 18 that engage behind or above the sweatband keep the hat 9 on the rack 10 during acceleration and deceleration of the car. The projections support the hat 9 at multiple locations to minimize deformation to the stored hat 9 and increase air flow through the stored hat 9 allowing moisture to more easily evaporate.

The automobile head rest hanging hat rack 10 according to the invention can include a plurality of horizontal hinge members 20, living hinges, to allow the back 16 to conform to the shape of the automobile seat 3. The parallel hinges 20 are horizontal when the rack is hanging on the post 7 of the headrest 5 of the seat 3. The automobile head rest hanging hat rack 10 includes a hook 22 at a top thereof configured to engage one post 7 of a headrest 5 of the automobile seat 3. The wire embodiment of FIG. 6 includes two hooks 22, one for each post 7.

The automobile head rest hanging hat rack 10 according to the invention of FIGS. 1-5 further include two side rib members 24, each rib member 24 coupling the back 16, the base 14 and the oval shaped hat hanging member 12. In embodiments of FIGS. 1-4, each rib member 24 is integral with the base 14 (coupled via a living hinge) and includes a pair of arrow head members 26 (also called ears or tabs) configured to engage in associated slots 28 on the back 16 and the member 12 in the assembled hanger or rack 10. The arrow heads 26 (or tabs or ears) are slightly bigger than the slot 28 for plastic and cardboard and other pliable materials. For molded construction the arrow heads 26 can include molded lateral locking ramps 30 to help maintain the arrowheads 26 in position (shown only in FIG. 3B). The locking ramps 30, if provided for molded versions, will be locked into the slot 28 by passing there through although with sufficient force the arrow head 26 can be removed. Injection molding allows for use of conventional plastics that accommodate heat in a car. Cardboard will also accommodate the heat found in the interiors of cars.

Additionally, the automobile head rest hanging hat rack 10 may include holes in each side rib, as shown, configured to form finger holes 32 to assist in assembling the hat rack 10. The holes 32 also serve to minimize material forming of the rack 10.

The automobile head rest hanging hat rack 10 as shown in FIGS. 1-5 may be easily molded and configured to be formed in a simple two piece waffle mold without separate slides or undercuts. The embodiment of FIG. 5 shows the ribs 24 being integral with the hat hanging member 12 showing an alternative formation, however the embodiment of FIGS. 1-4 is believed to be more intuitive for assembly (as shown in FIGS. 2A-D).

The automobile head rest hanging hat rack 10 according to the embodiment of FIG. 6 forms the rack 10 as a wire frame. However the automobile head rest hanging hat rack 10 formed as a single piece, knock down structure of FIGS. 1-5 allows for the rack 10 to ship flat making it economical for shipping. Additionally the user may elect to disassemble the rack 10 and store it in a flat condition till it is needed.

Conventional stress relief may also be provided on the molded rack adjacent the living hinges which help prevent tears and rips from occurring and propagating.

It will be apparent to those of ordinary skill in the art that various changes may be made to the present invention without departing from the spirit and scope thereof. The spirit and scope of the present invention is defined in the appended claims and equivalents thereto.

What is claimed is:

1. An automobile head rest hanging hat rack configured to be coupled to the headrest of an automobile seat, the hat rack comprising an oval shaped hat hanging member configured to be spaced from the automobile seat and configured to engage the interior of an American cowboy hat or traditional Police Sherriff's hat to be engaged at a position above a sweatband of the American cowboy hat or traditional Police Sherriff's hat, wherein the hat rack comprises a back configured to be adjacent to the automobile seat, a base coupled to a lower end of the back and extending away from the back and the oval shaped hat hanging member coupled to the base at a position opposite the position of the coupling of the back to the base.

2. The automobile head rest hanging hat rack according to claim 1 wherein the oval shaped hat hanging member is configured to extend toward the automobile seat from the base.

3. The automobile head rest hanging hat rack according to claim 1 wherein the oval shaped hat hanging member extends from the base in a direction extending toward the back.

4. The automobile head rest hanging hat rack according to claim 1 wherein the back gets wider in a portion thereof to assist in to allow for hanging stability as it leans against the seat.

5. The automobile head rest hanging hat rack according to claim 1 wherein a perimeter of the oval shaped hat hanging member has a plurality of projections extending therefrom configured to have a plurality of the projections engage above the sweatband of the hat.

6. The automobile head rest hanging hat rack according to claim 1 wherein the hat rack is formed as a single piece, die cut, knock down structure.

7. The automobile head rest hanging hat rack according to claim 6 wherein the back includes a plurality of horizontal hinge members to allow the back to conform to the shape of the automobile seat.

8. The automobile head rest hanging hat rack according to claim 7 wherein the back includes a hook at a top thereof configured to engage a post of a headrest of the automobile seat.

9. The automobile head rest hanging hat rack according to claim 6 further including two side rib members, each rib member coupling the back, the base and the oval shaped hat hanging member.

10. The automobile head rest hanging hat rack according to claim 9 wherein each rib member includes a pair of arrow head members configured to engage in associated slots in the assembled hanger.

11. The automobile head rest hanging hat rack according to claim 10 wherein each arrow head member is slightly bigger than an associated slot.

12. The automobile head rest hanging hat rack according to claim 10 wherein each side rib member includes holes configured to form finger holes to assist in assembling the hat rack.

13. The automobile head rest hanging hat rack according to claim 6 wherein hat rack is molded and configured to be formed in a simple two piece waffle mold without separate slides or undercuts.

14. The automobile head rest hanging hat rack according to claim 1 wherein the hat rack is formed as a wire frame.

15. An automobile head rest hanging hat rack configured to be coupled to the headrest of an automobile seat, wherein the hat rack is formed as a single piece, knock down structure, a back configured to be adjacent to the automobile seat, a base coupled to a lower end of the back and extending away from the back and a hat hanging member coupled to the base at a position opposite the position of the coupling of the back to the base, wherein the hat hanging member is configured to be spaced from the automobile seat and configured to engage the interior of an American cowboy hat or traditional Police Sherriff's hat to be engaged at a position above a sweatband of the American cowboy hat or traditional Police Sherriff's hat, wherein the hat hanging member is an oval shaped hat hanging member which extends from the base in a direction extending toward the back.

16. The automobile head rest hanging hat rack according to claim 15 wherein a perimeter has a plurality of projections extending therefrom configured to have a plurality of the projections engage above the sweatband of the hat.

17. The automobile head rest hanging hat rack according to claim 15 further including two side rib members, each rib member coupling the back, the base and the oval shaped hat hanging member.

18. The automobile head rest hanging hat rack according to claim 17 wherein each rib member is integral with the base and includes a pair of arrow head members configured to engage in associated slots in the back and the hat hanging member in the assembled hat rack.

* * * * *